US011578667B2

(12) United States Patent
Smith (10) Patent No.: US 11,578,667 B2
(45) Date of Patent: Feb. 14, 2023

(54) EFFICIENCY-BASED MACHINE CONTROL

(71) Applicant: Rolls-Royce Corporation, Indianapolis, IN (US)

(72) Inventor: Alan Smith, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 545 days.

(21) Appl. No.: 16/118,097

(22) Filed: Aug. 30, 2018

(65) Prior Publication Data

US 2020/0072130 A1 Mar. 5, 2020

(51) Int. Cl.
*F02C 9/00* (2006.01)
*F01D 21/00* (2006.01)
*G05B 13/04* (2006.01)

(52) U.S. Cl.
CPC .............. *F02C 9/00* (2013.01); *F01D 21/003* (2013.01); *G05B 13/042* (2013.01); *F05D 2220/32* (2013.01); *F05D 2220/76* (2013.01); *F05D 2230/80* (2013.01); *F05D 2270/20* (2013.01); *F05D 2270/303* (2013.01); *F05D 2270/3061* (2013.01); *F05D 2270/44* (2013.01); *F05D 2270/54* (2013.01)

(58) Field of Classification Search
CPC ........................................................ F02C 9/00
See application file for complete search history.

(56) References Cited

U.S. PATENT DOCUMENTS

| | | | |
|---|---|---|---|
| 6,823,253 B2 | 11/2004 | Brunell | |
| 7,836,680 B2 | 11/2010 | Schwarz | |
| 8,246,503 B2 | 8/2012 | Sheridan | |
| 8,490,404 B1 | 7/2013 | Adibhatla et al. | |
| 8,572,943 B1 | 11/2013 | Sheridan | |
| 9,249,729 B2 | 2/2016 | Bacic | |
| 9,481,473 B2 | 11/2016 | Skertic | |
| 2005/0056021 A1* | 3/2005 | Belokon | F02C 9/32 60/772 |
| 2012/0130617 A1 | 5/2012 | Raimarckers | |
| 2013/0227954 A1* | 9/2013 | Marini | F02C 9/20 60/773 |
| 2014/0305128 A1* | 10/2014 | Poyyapakkam | F23R 3/26 60/772 |
| 2016/0222820 A1* | 8/2016 | Truesdale | F01D 25/002 |
| 2018/0156120 A1 | 6/2018 | Menheere | |
| 2018/0195405 A1* | 7/2018 | Abrol | F02C 3/04 |

* cited by examiner

*Primary Examiner* — Ehud Gartenberg
*Assistant Examiner* — William L Breazeal
(74) *Attorney, Agent, or Firm* — Shumaker & Sieffert, P.A.

(57) ABSTRACT

A system can include a gas turbine and a processing system. The gas turbine can include a compressor coupled to a turbine through a shaft. The processing system can be configured to: automatically transition an operating condition of the system through a plurality of operating states; determine an efficiency of the system at each of a plurality of the operating states; for each of the plurality of operating states: select a future operating state of the system based on the determined efficiency of the current operating state.

13 Claims, 8 Drawing Sheets

EFFICIENCY-BASED MACHINE CONTROL

BACKGROUND

Field of the Disclosure

The present disclosure relates to controlling machines, such as gas turbine engines, based on mechanical efficiency. Mechanical efficiency can be estimated based on temperature measurements.

Description of Related Art

Machines can be configured to convert energy from one form to another. For example, a gas turbine engine can convert chemical energy stored in jet fuel into mechanical energy stored in a spinning turbine. An electric generator can convert mechanical energy supplied by a spinning shaft into electrical energy (i.e., electricity). An electric motor can perform the reverse operation.

Some energy will be lost as heat during energy conversion and transmission. For example, some of the mechanical energy transmitted from a spinning turbine to a mainshaft will be lost as heat as mainshaft frictionally engages radial support bearings. Similarly, electrical resistance will convert electrical energy transmitted through wires into heat.

SUMMARY

A system can include: a gas turbine comprising a compressor coupled to a turbine through a shaft; and a processing system configured to: receive a desired operating state for an operating condition; automatically expand a range of the desired operating state; capture an ambient condition; select a subset of the expanded desired operating state range based on the captured ambient condition and a multi-dimensional map relating the operating condition with the ambient condition; and control the gas turbine based on the selected subset.

A system can include: a compressor coupled to a turbine through a shaft, and a processing system. The processing system can be configured to: automatically iterate an operating condition of the system through a plurality of operating states; determine a steady state efficiency of the system at each of the iterated operating states; and for each of a plurality of the iterations: select the operating state for the subsequent iteration based on the steady state efficiency of the current iteration and the operating state of the current iteration.

A system can include: a gas turbine comprising a compressor coupled to a turbine through a shaft, and a processing system configured to: automatically transition an operating condition of the system through a plurality of operating states; determine an efficiency of the system at each of a plurality of the operating states; for each of the plurality of operating states: select a future operating state of the system based on the determined efficiency of the current operating state.

In a system including a gas turbine comprising a compressor coupled to a turbine through a shaft, a method can include: automatically transitioning an operating condition of the system through a plurality of operating states; determining an efficiency of the system at each of a plurality of the operating states; and for each of the plurality of operating states: selecting a future operating state of the system based on the determined efficiency of the current operating state.

BRIEF DESCRIPTION OF DRAWINGS

The above summary and the below detailed description of illustrative embodiments may be read in conjunction with the appended Figures. The Figures show some of the illustrative embodiments discussed herein. As further explained below, the claims are not limited to the illustrative embodiments.

DETAILED DESCRIPTION

Illustrative (i.e., example) embodiments are disclosed. The claims are not limited to the illustrative embodiments. Therefore, some implementations of the claims will have different features than in the illustrative embodiments. Changes to the claimed inventions can be made without departing from their spirit. The claims are intended to cover implementations with such changes.

The present application may use directional terms (e.g., front, back, top, bottom, left, right, etc.) to give the reader context when viewing the Figures. Directional terms do not limit the claims. Any directional term can be replaced with a numbered term (e.g., left can be replaced with first, right can be replaced with second, and so on). Furthermore, any absolute term (e.g., high, low, etc.) can be replaced with a corresponding relative term (e.g., higher, lower, etc.).

Figure 1:
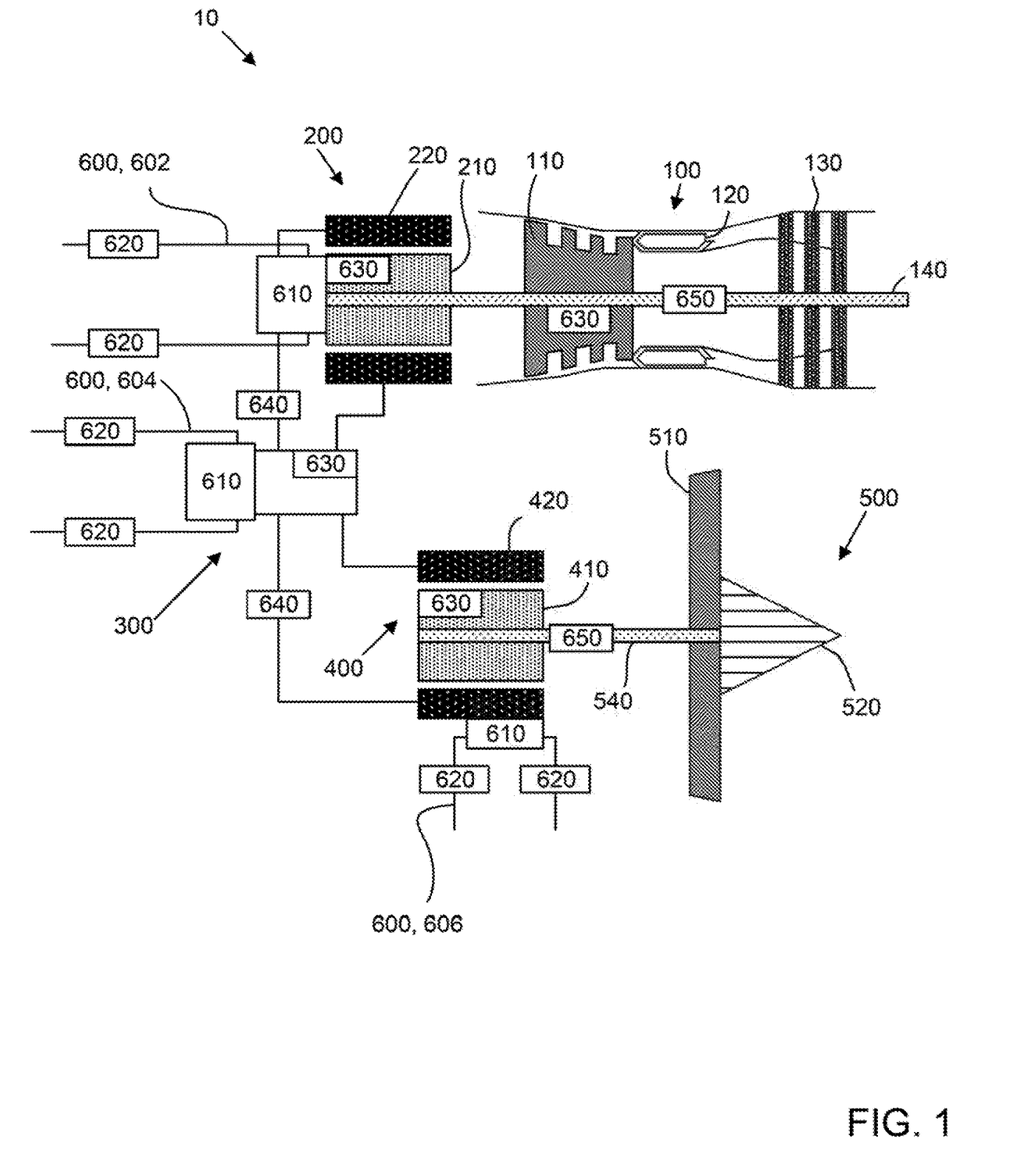
FIG. 1 schematically shows an exemplary embodiment of a system.

Referring to FIG. 1, a system 10 (also called a machine) can include a gas turbine system 100, a first electric machine 200, intermediate circuitry 300, a second electric machine 400, and a fan 500. System 10 in FIG. 1 can operate as a hybrid aircraft drive.

Gas turbine system 100 can include a compressor 110 (i.e., a compressor assembly), a combustor 120 (i.e., a combustor assembly), a turbine 130 (i.e., a turbine assembly), and a mainshaft 140 (i.e., a mainshaft assembly). Compressor 110 can pressurize ambient air. Combustor 120 can inject fuel into the pressurized ambient air, then ignite the fuel/air mixture. The combustion products can expand to spin turbine 130. Both turbine 130 and compressor 110 can be directly attached to mainshaft 140 such that rotational energy developed at turbine 130 can drive compressor 110.

First electric machine 200 can include a rotor 210 (i.e., a rotor assembly) and a stator 220 (i.e., a stator assembly). One of rotor 210 and stator 220 can include magnets. The other of rotor 210 and stator 220 can act as an armature. Like compressor 110 and turbine 130, rotor 210 can be attached mainshaft 140 such that turbine 130 transmits rotational power to rotor 210 mainshaft 140.

As with all shafts (i.e., shaft assemblies) discussed herein, mainshaft 140 can be a series of discrete shafts mechanically coupled via one or more transmissions (e.g., gearboxes). For example, a differential gearbox can be disposed along mainshaft 140 between compressor 110 and rotor 210.

First electric machine 200 can be configured to operate as an electric motor and/or an electric generator. First electric machine 200 can convert mechanical power supplied by gas turbine 100 into electrical power (e.g., alternating current). First electric machine 200 can supply the electrical power to second electric machine 400 via intermediate circuitry 300. First electric machine 200 can convert electric power supplied by intermediate circuitry 300 into mechanical power to drive mainshaft 140, which can assist during startup of gas turbine 100. First electric machine 200 can switch between functioning as an electric generator and an electric motor based on the direction of electric current flow and/or magnitude of applied voltage relative to internally generated voltage or electromotive force.

Intermediate circuitry 300 can store electric energy and/or convert electric energy into a new state (e.g., convert alternating current into direct current and/or the opposite). Intermediate circuitry 300 can include a plurality electrical components such as batteries, converters (e.g., inverters, rectifiers), and so on.

Second electric machine 400 can function as an electric motor and/or an electric generator. When functioning as an electric motor, second electric machine 400 can receive electrical power from intermediate circuitry 300. When functioning as an electric generator, second electric machine 400 can convert mechanical power present in fan 500 into electric power, which second electric machine 400 can transmit to intermediate circuitry 300 for storage. Second electric machine 400 can include a rotor 410 and a stator 420. One of rotor 410 and stator 420 can include magnets. The other of rotor 410 and stator 420 can act as an armature. Second electric machine 400 can switch between functioning as an electric generator and an electric motor based on the direction of electric current flow and/or magnitude of applied voltage relative to internally generated voltage or electromotive force.

A fan-shaft 540 (i.e., a second shaft) can be attached to rotor 410. As with mainshaft 140, fan-shaft 540 can be an assembly of one or more discrete shafts mechanically coupled through one or more speed reduction gearboxes. Second electric machine 400 can transmit mechanical energy through fan-shaft 540 to fan 500, which propel an aircraft. Fan 500 can transmit mechanical power through fan-shaft 540 to second electric machine 400 for electric power generation. Therefore, system 100 can be configured to decelerate fan 500 by generating electric power. Fan 500 can include fan blades 510 and a nose cone 520.

Figure 1A:
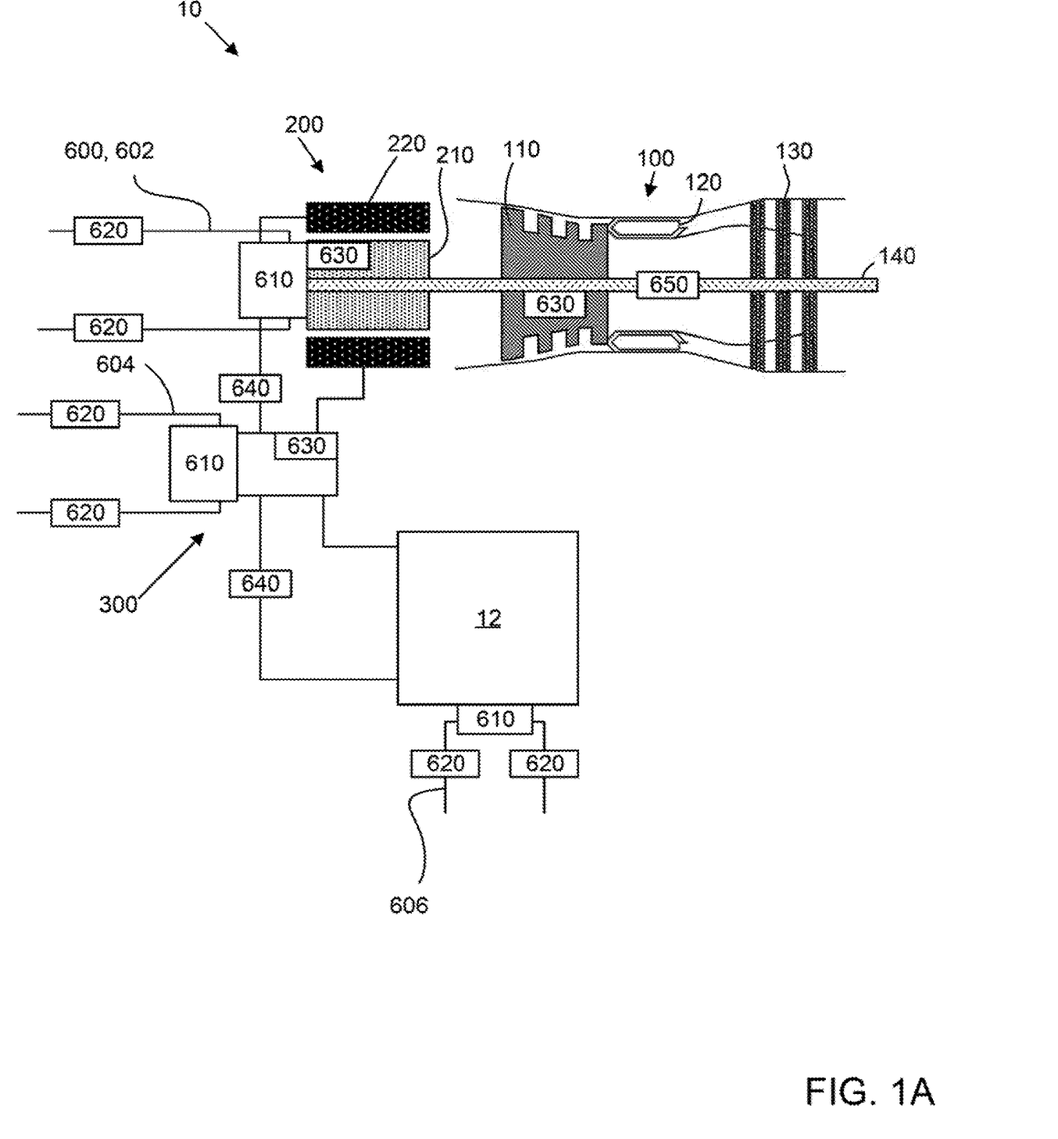
FIG. 1A schematically shows another exemplary embodiment of the system.
Figure 1B:
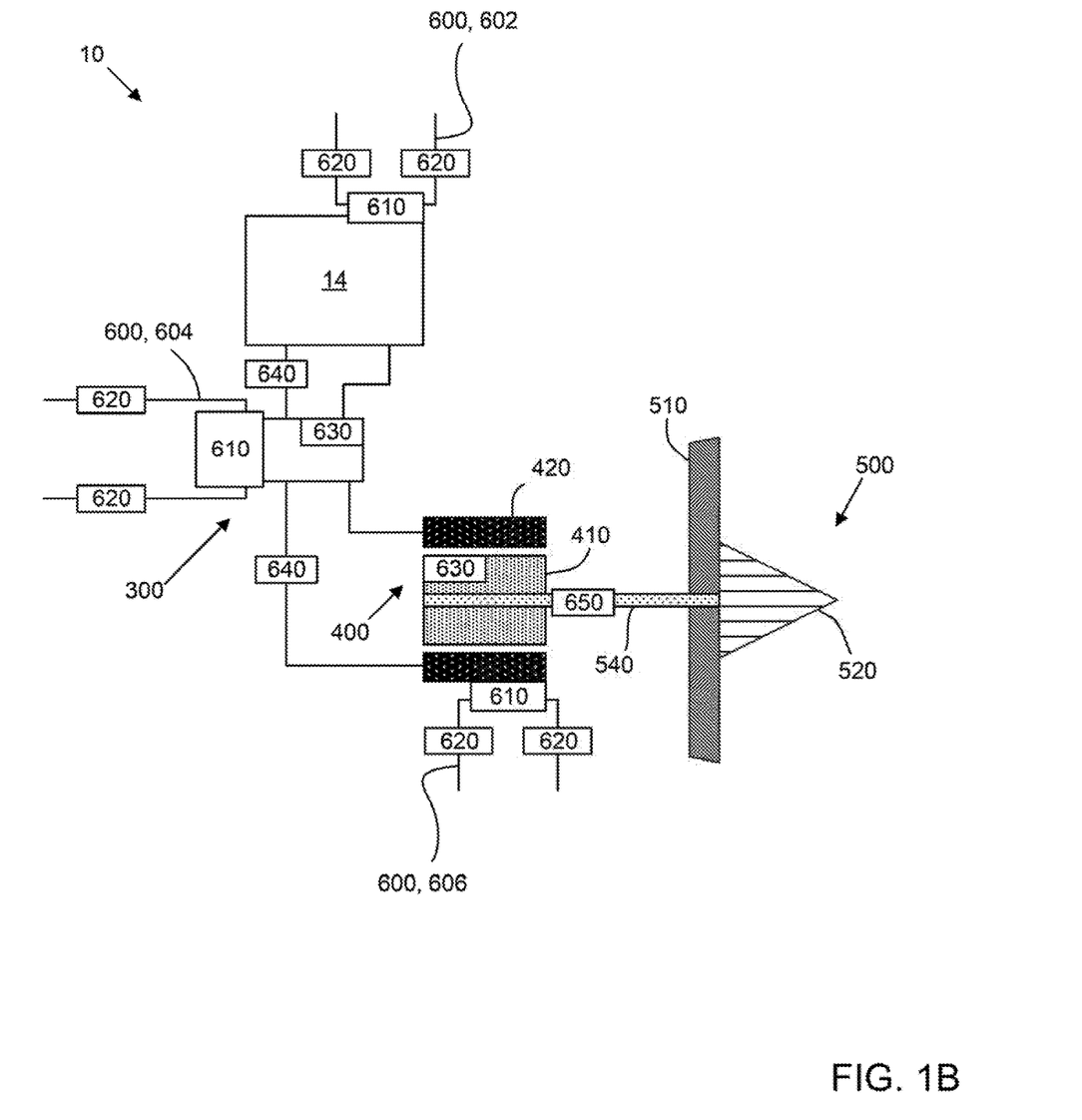
FIG. 1B schematically shows another exemplary embodiment of the system.

System 10 is not limited to a hybrid aircraft drive. System 10 can be a turbofan, such as a geared turbofan. System 10 can be any kind of vehicle engine, such as an automobile engine. System 10 is not limited to being an engine. In FIG. 1A, intermediate circuitry 300 of system 10 directs electric power into any kind of electric power consumer 12 (e.g., a transmission, a heater, a computer server, a motor for a liquid pump). In FIG. 1B, intermediate circuitry 300 of system 10 is configured to receive electric power from any kind of electric power supply 14 (e.g., solar panels, a nuclear power plant, a piston-drive internal combustion engine) and second electric machine 400 is mechanically coupled with any kind of rotational device 16 (e.g., a propeller in a submarine or other marine vessel, a subsequent electric machine, a compressor, a liquid pump, etc.).

Referring to FIGS. 1, 1A, and 1B, a first fluid circuit 600, 602 can be configured to cool first electric machine 200 with a first heat exchanger 610. A second fluid circuit 600, 604 can be configured to cool intermediate circuitry 300 (e.g., an electric converter) with a second heat exchanger 610. A third fluid circuit 600, 606 can be configured to cool second electric machine 400 with a third heat exchanger 610.

Each fluid circuit 600 can be a closed circuit or an open circuit. Although not shown, each fluid circuit 600 can include a fluid pump for moving a working fluid (e.g., a two-phase refrigerant such as R134A, or a liquid such as oil or glycol-water), a condenser for cooling the working fluid, one or more valves, one or more bypass lines, etc. System 10 can include multiple other fluid circuits (not shown).

System 10 can include a processing system ("PS") 50 (further discussed below). PS 50 can include a plurality of fluid circuit sensors 620 configured to capture metrics of system 10 (e.g., fluid passing through system 10). Each fluid circuit 600 can include a fluid sensor 620 disposed upstream of heat exchanger 610 and a fluid sensor 620 disposed downstream of heat exchanger 610. Each fluid sensor 620 can be configured to capture temperature, pressure, and/or flow rate of working fluid.

PS 50 can include a plurality of solid temperature sensors 630 configured to capture metrics of solid components in system 10. PS 50 can include one or more generator temperature sensors 630 for capturing one or more temperatures of first electric machine 200, one or more intermediate circuitry temperature sensors 630 for capturing one or more temperatures of intermediate circuitry 300, and one or more motor temperature sensors 630 for capturing one or more temperatures of second electric machine 400.

PS 50 can include a first electric sensor 640 for capturing current and/or voltage output by first electric machine 200. PS 50 can include a second electric sensor 640 for capturing current and/or voltage output by intermediate circuitry 300 to second electric machine 400. PS 50 can include a first rotational sensor 650 for capturing a rotational speed of first mainshaft 140 and a second rotational sensor 650 for capturing a rotational speed of second mainshaft 540. Although some are not shown, PS 50 can include a sensor for any metric disclosed herein. For example, the present application discloses measuring a flow rate of fuel to combustor 120. Such disclosure should be interpreted to mean that PS 50 can include a fuel flow rate sensor for combustor 120.

PS 50 can apply metrics captured with sensors 620, 630, 640, 650 to optimize operating conditions, such as the rotational speed of mainshaft(s) 140, 540, switching frequency, switching pulse time, and/or duty cycle of a converter of intermediate circuitry 300, voltage and/or current output from first electric machine 200, voltage and/or current output from intermediate circuitry 300, rate of fuel injection via combustor 120, velocity of system 10, propulsive power of system 10, fuel power of system 10, and/or efficiency of system 10. If first electric machine 200 is a field wound generator, then exciter current can also be a control parameter. According to some embodiments, PS 50 can determine (e.g., estimate) heat loss with the metrics received from sensors 620a, 630, 640, 650.

PS 50 can approximate $HL_{total,X} = HL_{internal,X} + HL_{wf,X}$, where $HL_{total,X}$ is the total rate of heat loss for a component X, $HL_{internal,X}$ is the portion of $HL_{total,X}$ internally retained in the solid material defining component X, and $HL_{wf,X}$ is the portion of $HL_{total,X}$ absorbed by a working fluid(s) in thermal communication with component X.

When a component is in a steady state condition (e.g., when internal material temperature of the component fluctuates less than a predetermined threshold), PS 50 can assume that $HL_{internal,X}$ is zero such that $HL_{total,X} = HL_{wf,X}$. PS 50 can approximate $HL_{wf,X} = Cp_{wf,X} * \Delta T_{wf,X} * Q_{wf,X}$, where $Cp_{wf,X}$ is a specific heat capacity of the working fluid, $\Delta T_{wf,X}$ is the change in temperature of the working fluid across component X, and $Q_{wf,X}$ is a mass flow rate of the working fluid across component X.

In some cases, the heat absorption of a first fluid (e.g., fluid in fluid circuit 600) may dominate the heat absorption of a second fluid (e.g., air). In such a case, PS 50 can be configured to ignore heat absorption of the second fluid. In other cases, PS 50 can be configured to consider heat absorption of all working fluids in thermal communication with the component such that $HL_{wf,X}=HL_{wf1,X}+HL_{wf2,X}$, where wf1 is a first working fluid and wf2 is a second working fluid.

When a component is in a thermally transient condition (e.g., when internal temperature of the component fluctuates more than a predetermined threshold), PS 50 can compute $HL_{internal,X}=[c]_X*\Delta TR_X$, where $[c]_X$ is a known specific heat capacity of component X and $\Delta TR_X$ is the rate of temperature change in component X. During a thermally transient condition, each element of any component X can have a different heat absorption rate. Therefore, it can be advantageous to apply a unique thermal model for each solid component X.

By determining heat absorption of solid components during a thermally transient condition, it is possible for PS 50 to more accurately determine the total heat loss (and therefore efficiency of system 10, as further discussed below) without waiting for system 10 to achieve a thermal steady state.

As previously discussed, when the present applications discloses a formula that relies on a variable physical metric (e.g., temperature change, flow rate, current, voltage, etc.), it should be assumed that suitable sensor(s) are disposed at the location(s) necessary to capture such a metric. For example, when the present application discloses $\Delta T_{wf,X}$, various embodiments include a sensor configured to measure the temperature of air directly upstream of component X and a sensor configured to measure the temperature of air directly downstream of component X.

Figure 2:
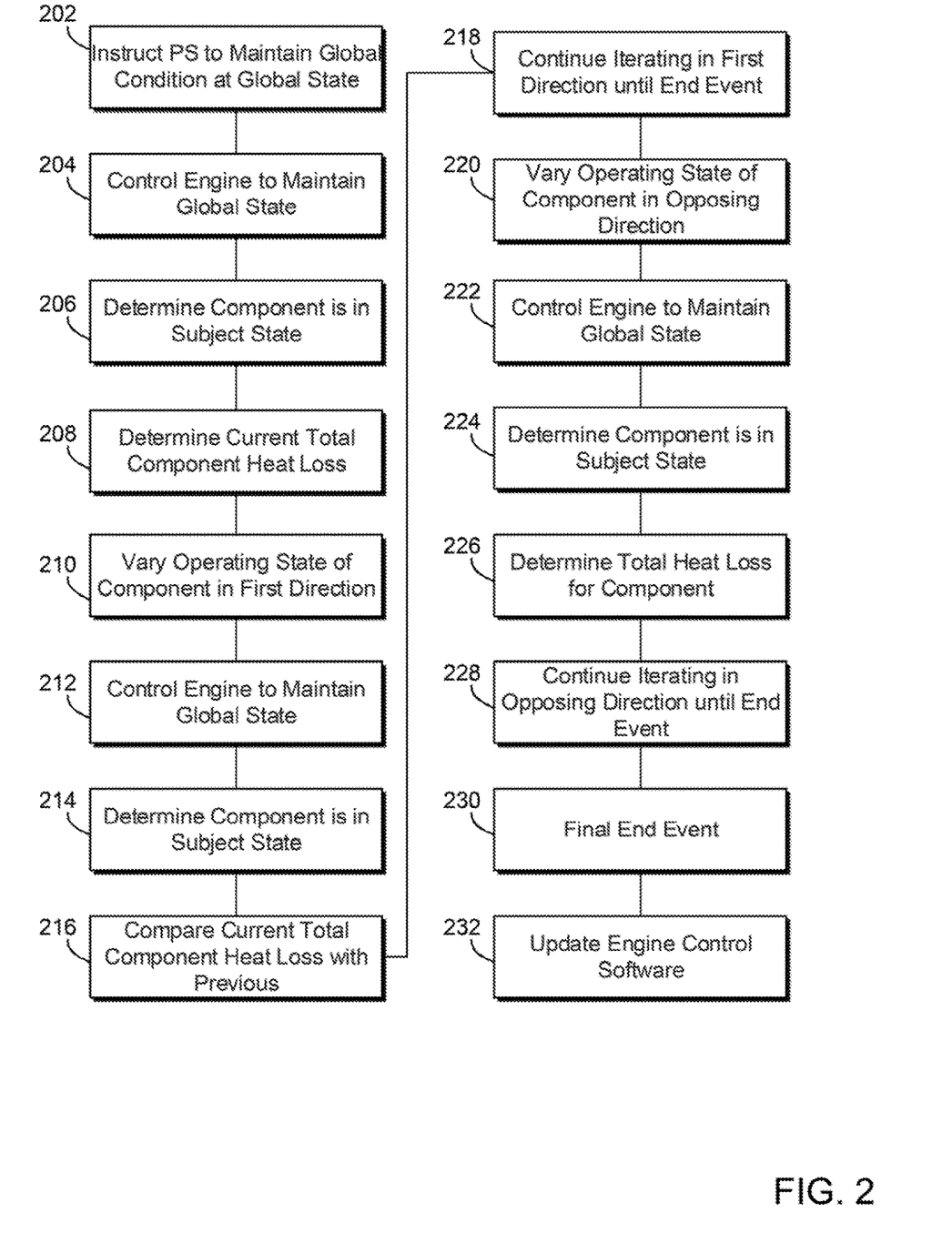
FIG. 2 is a block diagram of an exemplary method for controlling the system.

FIG. 2 presents a method of determining (e.g., estimating) an efficient operating state for an operation condition of a component X based on thermal metrics. At block 202, a user (e.g., a pilot, a software program) can instruct PS 50 to operate at (i.e., maintain) a first global state of a first global condition (e.g., at a thrust, velocity, a propulsive power, fuel power, efficiency, etc.). At block 204, PS 50 can control system 10 to maintain the first global state.

At block 206, PS 50 can determine that system 10 has reached the first global state and that component X has attained a subject state based on $\Delta TR_X$ being less than a predetermined maximum (e.g., within a range of −5° C./hr to 5° C./hr). A subject state can be a transient state or a steady state (e.g., a quasi-steady state). Alternatively, or in addition, PS 50 can determine that component X has attained subject state when component X has operated within predetermined limits for at least a predetermined amount of time.

The predetermined limits can be predetermined percentages (e.g., 90% and 110%) of a running average of the relevant operating condition for a predetermined amount of time (e.g., 60 seconds). For example, if the running average of first mainshaft 140 is 4000 RPM over the past 60 seconds, then PS 50 can determine that first electric machine 200 and/or gas turbine 100 is/are in a subject state if each of RPM values of first mainshaft 140 over the past 60 seconds have been within the range [0.9*4000 RPM, 1.1*4000 RPM], where 0.9 corresponds to 90% and 1.1 corresponds to 110%.

At block 208, PS 50 can determine $HL_{total,X,0}=HL_{wf,X}=HL_{wf1,X}+HL_{wf2,X}=(Cp_{wf1,X}*\Delta T_{wf1,X}*Q_{wf1,X})+(Cp_{wf2,X}*\Delta T_{wf2,X}*Q_{wf2,X})$, where wf1 is a working fluid circulating in a fluid circuit 600 in thermal communication with component X, component X and wf2 is air in thermal communication with component X, and "0" means a first iteration (also called "cycle"). To enhance accuracy, PS 50 can incorporate heat absorption into solid material at block 208 such that $HL_{total,X,0}=HL_{wf,X}=HL_{wf1,X}+HL_{wf2,X}+HL_{internal,X}$.

At block 210, PS 50 can vary the operating state of component X in a first direction (e.g., increase or decrease) and by a first magnitude (e.g., by 10% of running average). At block 212, PS 50 can recontrol system 10 to maintain the first global setting of the first global condition, while keeping component X in the new operating state. At block 214, PS 50 can determine that component X has attained a subject state by, for example, reapplying the logic of block 206.

As previously discussed, examples of operating conditions include the rotational speed of mainshaft(s) 140, 540, switching frequency, switching pulse time, and/or duty cycle of a converter of intermediate circuitry 300, voltage and/or current output from first electric machine 200, voltage and/or current output from intermediate circuitry 300, rate of fuel injection via combustor 120, velocity of system 10, propulsive power of system 10, fuel power of system 10, and/or efficiency of system 10. If first electric machine 200 is a field wound generator, then exciter current can also be a control parameter.

At block 216, PS 50 can determine $HL_{total,X,1}$ by, for example, reapplying the logic of block 210 where "1" means a second iteration after the first iteration. PS 50 can compare $HL_{total,X,0}$ with $HL_{total,X,1}$. If $HL_{total,X,1}<HL_{total,X,0}$, then PS 50 can repeat blocks 208-216 to determine $HL_{total,X,2}$.

PS 50 can continue iterating blocks 208-216 until an iteration end event occurs. An iteration end event can occur (a) $HL_{total,X,N}<HL_{total,X,N+1}$ where "N" is any arbitrary whole number or (b) a new iteration causes any component of system 10 to exceed an operating limit. When such an end event occurs (block 218), PS 50 can vary the operating condition of component X in the opposing second direction (e.g., decrease or increase) and by a second magnitude (e.g., 5% of running average) (block 220). The second magnitude can be smaller than the first magnitude if PS 50 determined that $HL_{total,X,1}<HL_{total,X,0}$. The second magnitude can be greater than or equal to the first magnitude if PS 50 determined that $HL_{total,X,0}<HL_{total,X,1}$.

Blocks 222-226 can mirror blocks 212-216. PS 50 can continue iterating blocks 222-226 an iteration end event occurs. When an end event occurs (block 228), PS 50 can revert to block 218 to vary the operating condition of component X in the first direction (e.g., increase) and by a third magnitude (e.g., 2.5% of running average). The third magnitude can be smaller than the second magnitude if PS 50 determined $HL_{total,X,N}<HL_{total,X,N+1}$ for at least one iteration of the previous cycle.

PS 50 can perpetually iterate blocks 222-226 until a final end event occurs (block 230). The end condition can be a predetermined amount of time elapsing, a predetermined number of iterations being performed, and/or receiving a new desired global operating state for system 10 from the user (e.g., a new desired velocity setting). At block 232, PS 50 can update software for controlling component X based on the operating state of component X at block 230.

Figure 3:
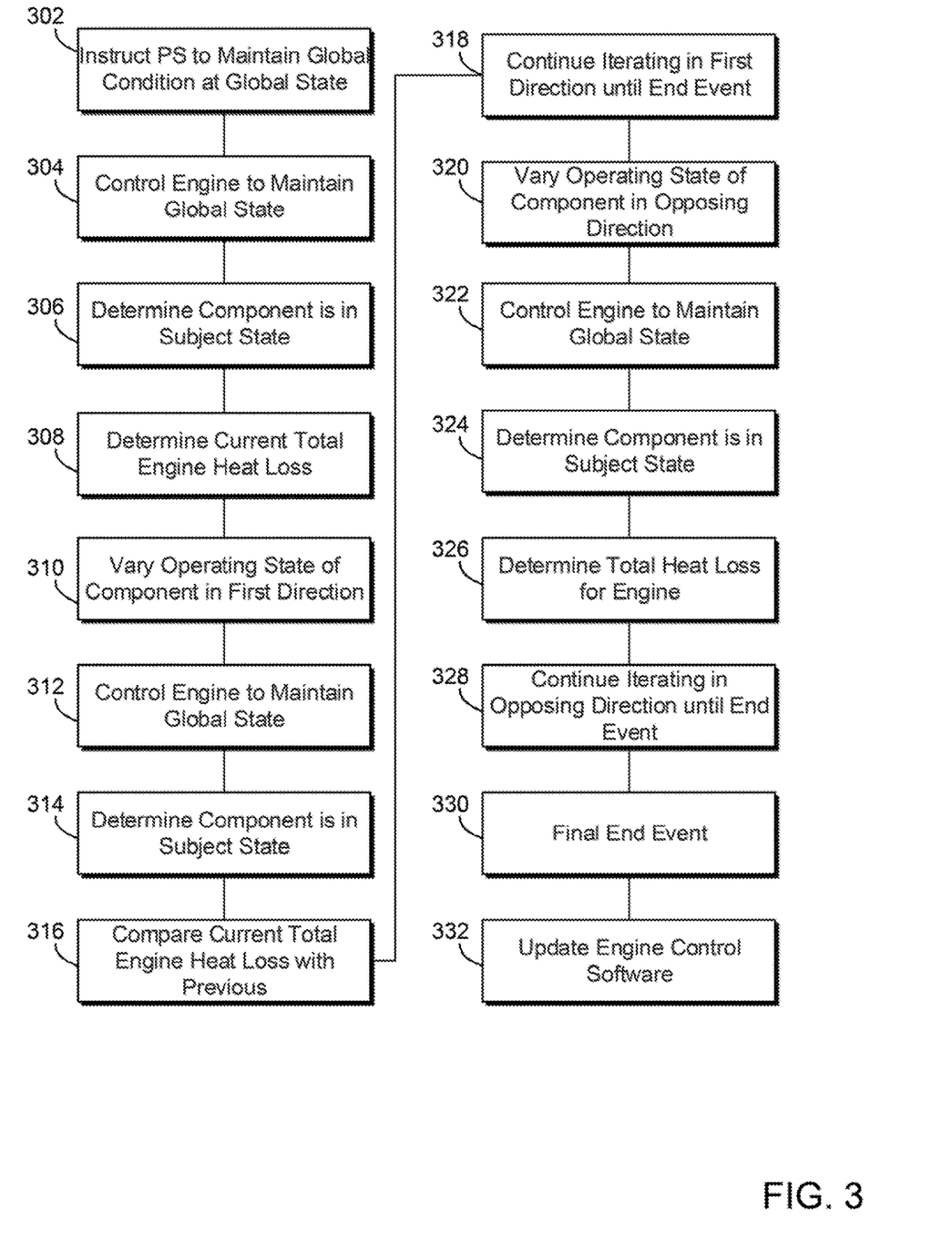
FIG. 3 is a block diagram of an exemplary method for controlling the system e.

FIG. 3 presents a method of determining (e.g., estimating) an optimum operating state of a component X based on global thermal metrics of system 10 (including component X). At block 302, the user can instruct system 10 to maintain a first global setting of a first global condition (e.g., at a thrust setting, a velocity setting, a propulsive power setting). At block 304, PS 50 can control system 10, including component X, to maintain the first global setting.

At block 306, PS 50 can determine that system 10 has reached the first global state and that component X has attained a subject state based on $\Delta TR_X$ being less than a predetermined maximum (e.g., within a range of $-5°$ C./hr to $5°$ C./hr). Alternatively, or in addition, PS 50 can determine that component X has attained a subject state when component X has operated within predetermined limits for at least a predetermined amount of time. PS 50 can calculate the predetermined amount of time based on the greatest thermal time constant for any component X in system 10.

The predetermined limits can be predetermined percentages (e.g., 90% and 110%) of a running average of a global condition for a predetermined amount of time (e.g., 60 seconds). For example, if the running average of velocity is 500 km/hr over the past 60 seconds, then PS 50 can determine that system 10 is in a subject state if each of velocity values of system 10 over the past 60 seconds have been within the range [0.9*500 km/hr, 1.1*500 km/hr], where 0.9 Corresponds to 90% and 1.1 corresponds to 110%.

At block 308, PS 50 can determine $HL_{total,machine,0} = HL_{total,X,0} + HL_{total,X+1,0} + HL_{total,X+2,0} \ldots$, where X is a first component, X+1 is a second component, X+2 is a third component, etc. As discussed above, PS 50 can rely on temperature measurements of working fluids and/or solid material(s) to determine total heat loss.

At block 310, PS 50 can vary an operating condition of a selected component X in a first direction (e.g., increase or decrease) and by a first magnitude (e.g., by 5 or 10% of running average). At block 312, PS 50 can recontrol system 10 to maintain the first global setting of the first global condition, while keeping component X in the new operating state. At block 314, PS 50 can determine that system 10 has attained a subject state by, for example, reapplying the logic of block 306.

As previously discussed, examples of operating conditions include the rotational speed of mainshaft(s) 140, 540, switching frequency, switching pulse time, and/or duty cycle of a converter of intermediate circuitry 300, voltage and/or current output from first electric machine 200, voltage and/or current output from intermediate circuitry 300, rate of fuel injection via combustor 120, velocity of system 10, propulsive power of system 10, fuel power of system 10, and/or efficiency of system 10. If first electric machine 200 is a field wound generator, then exciter current can also be a control parameter.

At block 316, PS 50 can determine $HL_{total,machine,1}$ by, for example, reapplying the logic of block 310 where "1" means a second iteration after the first iteration. PS 50 can compare $HL_{total,machine,0}$ with $HL_{total,machine,1}$. If $HL_{total,machine,1} < HL_{total,machine,0}$, then PS 50 can repeat blocks 308-316 to determine $HL_{total,machine,2}$.

PS 50 can continue iterating blocks 308-316 until an iteration end event occurs. An iteration end event can occur (a) when $HL_{total,machine,N} < HL_{total,machine,N+1}$ where "N" is any arbitrary whole number or (b) a new iteration causes any component of system 10 to exceed an operating limit. When an end event occurs (block 318), PS 50 can vary the operating condition of component X in the second direction (e.g., decrease or increase) and by a second magnitude (e.g., 5% of running average) (block 320). The second magnitude can be smaller than the first magnitude if PS 50 determined that $HL_{total,machine,1} < HL_{total,machine,0}$. The second magnitude can be greater than or equal to the first magnitude if PS 50 determined that $HL_{total,machine,0} < HL_{total,machine,1}$.

Blocks 322-326 can mirror blocks 312-316. PS 50 can continue iterating blocks 322-326 until an iteration end event occurs. When an end event occurs (block 328), PS 50 can revert to block 318 to vary the operating condition of component X in the first direction (e.g., increase) and by a third magnitude (e.g., 2.5% of running average). The third magnitude can be smaller than the second magnitude if PS 50 determined $HL_{total,machine,n} < HL_{total,machine,n+1}$ for at least one iteration of the previous cycle.

PS 50 can perpetually iterate blocks 322-226 until a final end event occurs (block 330). The end condition can be a predetermined amount of time elapsing, a predetermined number of iterations being performed, and/or receiving a new desired global operating state for system 10 from the user (e.g., a new desired velocity setting). At block 332, PS 50 can update software for controlling component X based on the operating state of component X at block 330.

Instead of relying on temperature metrics, PS 50 can determine (e.g., estimate) $HL_{total,machine}$ in the method of FIG. 3 by comparing propulsive power (the energy output by system 10) with fuel power (the energy present in the fuel consumed by system 10). The difference between propulsive power and fuel power can be $HL_{total,machine}$ (i.e., the rate of heat loss). The ratio between propulsive power and fuel power can be the power efficiency, $\eta_{power}$, of system 10: $\eta_{power} = $(propulsive power)/(fuel power)$ = 1 - (HL_{total,machine})/$(fuel power).

PS 50 can approximate $HL_{total,machine} = (T_{machine} * V_{machine}) - (q_{fuel} * e_{fuel})$, where $T_{machine}$ is the thrust generated by system 10 (e.g., torque in fan 500), $V_{machine}$ is the velocity of system 10 (e.g., rotational speed of fan 500), $q_{fuel}$ is the mass flow rate of fuel supplied into combustor 120, and $e_{fuel}$ is the energy present per unit mass of fuel. PS 50 can approximate $HL_{total,machine} = (T_{machine} * V_{machine}) - (q_{fuel} * e_{fuel})$. PS 50 can calculate thrust as a function of the mass flow rate of air entering system 10, the velocity of air entering system 10, the mass flow rate of any fluids (including combustion products) exiting system 10, and the velocity of those fluids exiting system 10. PS 50 can calculate $q_{fuel}$ with a flow rate sensor. PS 50 can store a predetermined value for $e_{fuel}$.

According to some embodiments, PS 50 can estimate propulsive power based on electrical power measured directly upstream of second electric machine 400. Therefore, PS 50 can estimate propulsive power based on current and voltage measured directly upstream of second electric machine 400.

According to some embodiments, PS 50 can treat gas turbine 100 and first electric machine 200 as a first subsystem and treat second electric machine 400 and fan 500 as a second subsystem, where each subsystem is subject to independent control by PS 50. PS 50 can find $HL_{total,first\ subsystem} = $(Electrical power supplied by first electric machine 200)$-(q_{fuel} * e_{fuel})$, where electric power supplied by first electric machine 200 is a product of current and voltage measured within intermediate circuitry 300 (e.g., directly downstream of first electric machine 200). Similarly, PS 50 can find $HL_{total,second\ subsystem} = (T_{machine} * V_{machine})-$(Electrical power supplied by intermediate circuitry 300), where electric power supplied to second electric machine 400 is a product of current and voltage measured within intermediate circuitry 300 (e.g., directly upstream of second electric machine 400).

Figure 4:
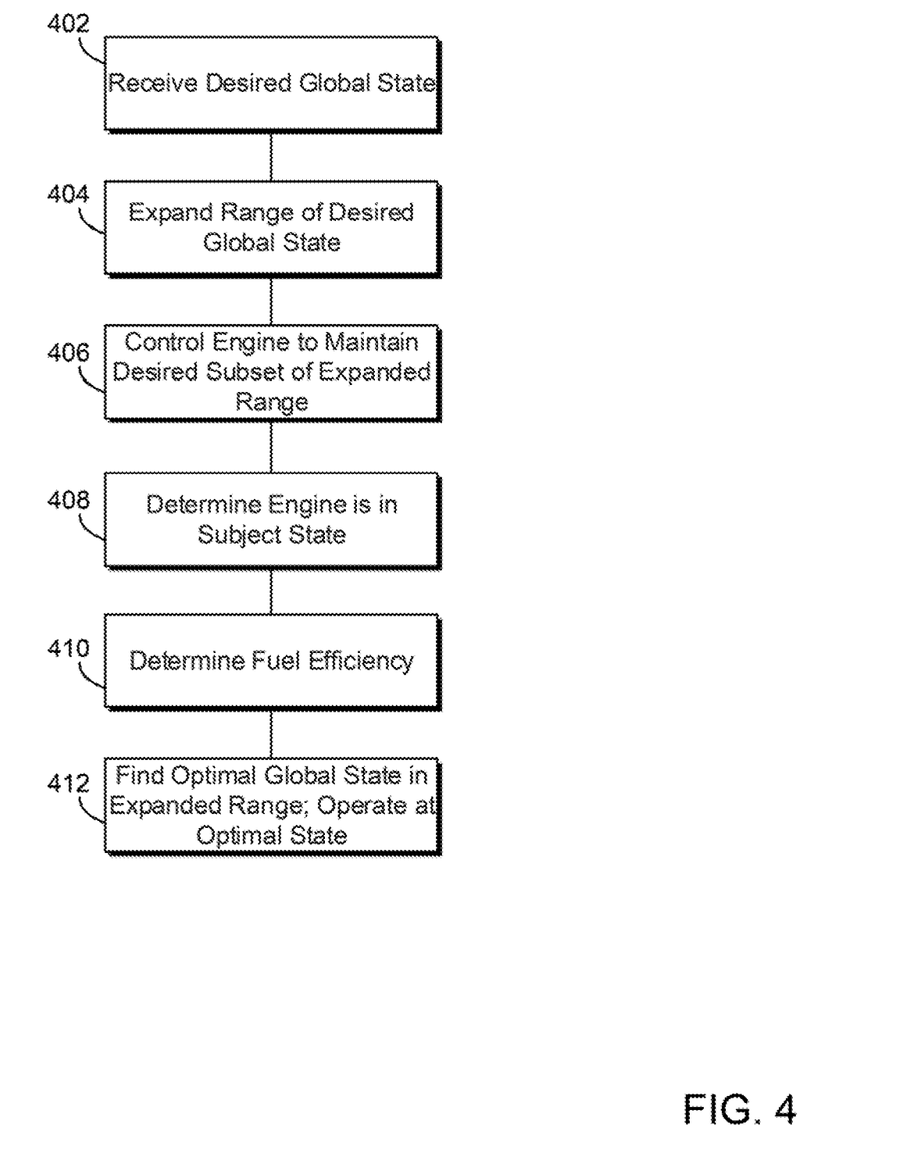
FIG. 4 is a block diagram of an exemplary method for controlling the system.

According to some embodiments, and as shown in FIG. 4, PS 50 can be configured to find global state of a global condition that maximizes $\eta_{power}$. At block 402, PS 50 can receive a desired global state of a global condition (e.g., velocity, thrust, propulsive power, fuel power, power output from first electric machine 200, power output from intermediate circuitry 300 to second electric machine 400).

At block 404, PS 50 can expand the desired global state to encompass a greater range of values. As with all blocks disclosed in the present application, PS 50 can perform block 404 automatically. For example, if PS 50 received 5000 RPM for velocity at block 402, PS 50 can expand the global state to encompass the greater range of 4900-5100 RPM at block 404.

At block 406, PS 50 can control system 10 to maintain a subset of value(s) the expanded global state. PS 50 can consult a multi-dimensional map (discussed below) to select the subset from the expanded range. For example, PS 50 can select a single global state within the expanded range based on the multi-dimensional map.

At block 408, PS 50 can determine that system 10 has attained a subject state using any of the previously discussed controls (e.g., block 306 of FIG. 3). At block 410, PS 50 can determine $\eta_{power,0}$ of system 10 by calculating any two of: $HL_{total,machine,0}$, propulsive power$_0$, and fuel power$_0$, as previously discussed.

At block 412, PS 50 can perform a series of increasing/decreasing iterations to find a global state in the expanded range that maximizes $\eta_{power}$. Iterations can be performed in the manner discussed with reference to FIGS. 2 and 3. For example, PS 50 can increase the global condition (e.g., velocity) by a first magnitude until $\eta_{power,N} > \eta_{power,N+1}$. PS 50 can then decrease the global condition by a second magnitude until $\eta_{power,N+y} > \eta_{power,N+y+1}$, etc. As discussed above, the first magnitude can be greater than the second magnitude if $\eta_{power,N} > \eta_{power,N+1}$ occurs at a value of N greater than 0 for any iteration. Otherwise, the second magnitude can be equal to the first magnitude. PS 50 can continuously repeat blocks 408-412 until receiving a new user instruction (block 402).

During block 412, PS 50 can sample the global setting range to determine an optimum setting instead of employing the above-discussed iterative search algorithm. For example, PS 50 can sequentially test each whole number in the global setting range (e.g., 4900-5100 RPM) during blocks 408-412, then return to the most efficient global setting within the range. PS 50 can record environmental conditions (e.g., air temperature, air humidity, air pressure, etc.) while performing block 412.

Figure 5:
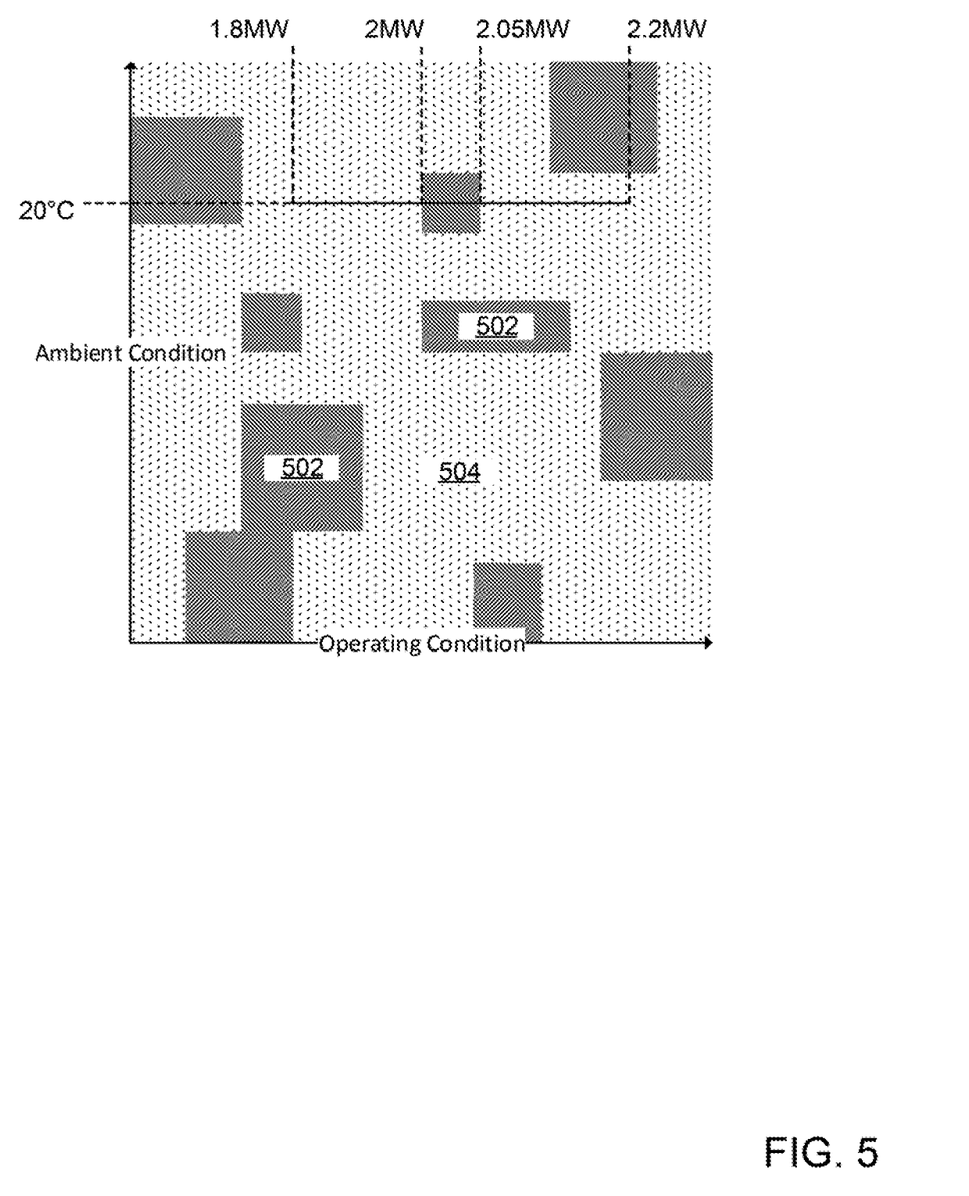
FIG. 5 shows an exemplary multi-dimensional map.

PS 50 can build multi-dimensional efficiency maps interrelating one or more global conditions (e.g., velocity), $\eta_{power}$, and environmental conditions with the metrics captured during block 410. FIG. 5 shows an example of a multi-dimensional efficiency map 500 where the X-axis quantifies electric power (i.e., an operating condition), the Y-axis quantifies ambient air temperature (i.e., an ambient condition), and the Z-axis quantifies $\eta_{power}$ (i.e., a global operating condition).

Referring to FIG. 5, the Z-axis extends out of the page. Z-axis values are represented with stippling where dense/dark stippling 502 represents larger Z-axis values and sparse/light stippling 504 represents smaller Z-axis values. Some of the coordinates of an efficiency can be captured during the method of FIG. 4. PS 50 can interpolate other coordinates based on the originally captured coordinates.

PS 50 can consult map 500 to determine (e.g., project) failure of a component in system 10. For example, PS 50 can compare a current efficiency to an expected efficiency based on map 500. If the current efficiency differs from the expected efficiency by a sufficient degree (e.g., more than 20%), then PS 50 can transmit a warning signal. A user can inspect and repair system 10 based on the warning signal.

When performing the method of FIG. 4, PS 50 can rely on a multi-dimensional efficiency map 500 when selecting an initial global condition setting within the calculated global condition range. The following example scenario relies on the illustrative efficiency map in FIG. 5. A user (e.g., a pilot or a software program running on PS 50) selected an electric power (either supplied by first electric machine 200 or received by second electric machine 400) of 2 MW. PS 50 expanded the electric power setting to range 2 MW±0.2 MW. PS 50 recorded an environmental air temperature as 20° C. Based on this information, PS 50 selected an initial electric power in the range of 2 MW–2.05 MW, which corresponds to the region of high efficiency 502 consistent with the ambient air temperature and the velocity range. The multi-dimensional map in FIG. 5 is only an example. According to various embodiments, a multi-dimensional map can be embodied as a series of look-up tables, a series of equations, etc.

Figure 6:
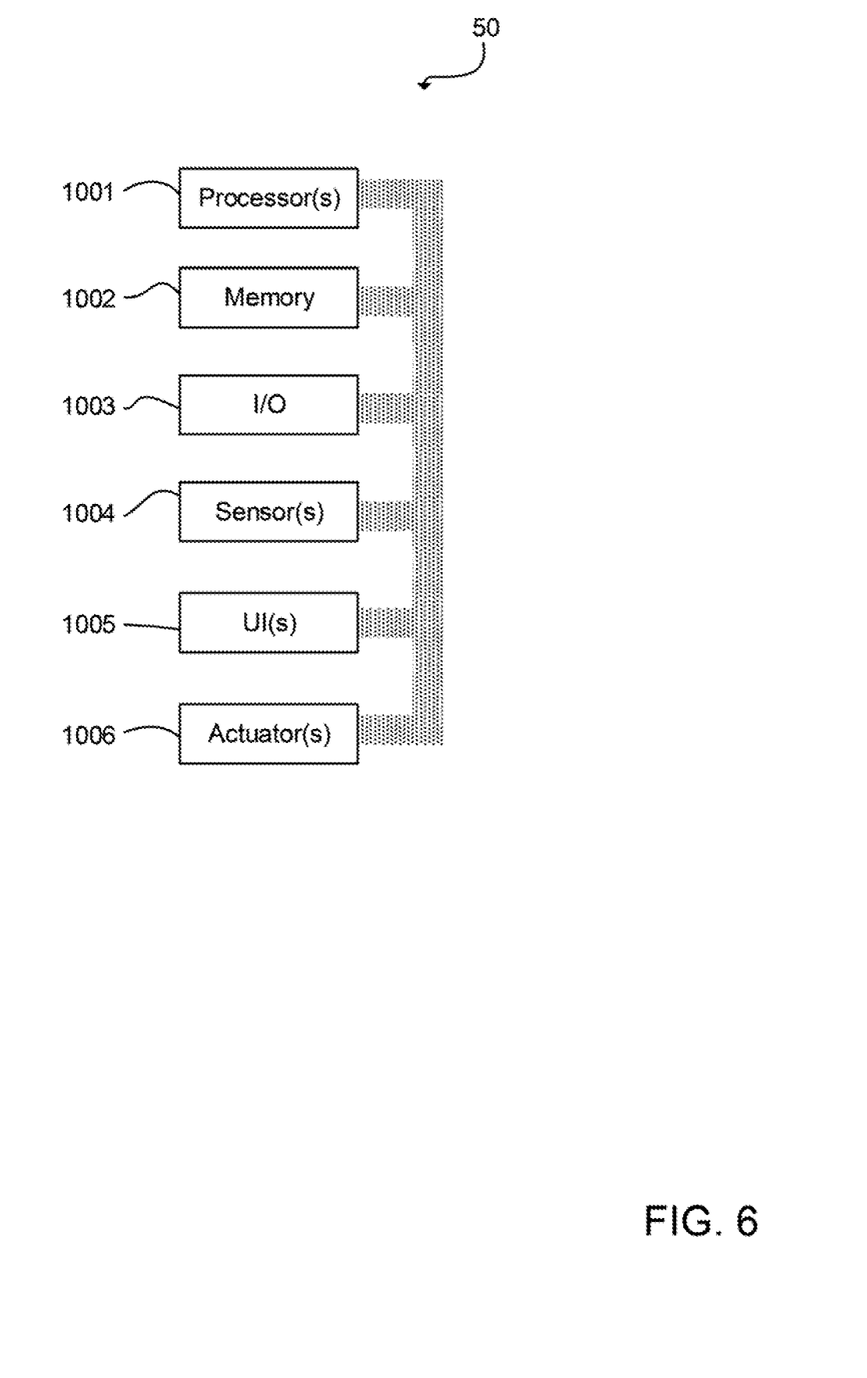
FIG. 6 is a block diagram of an exemplary processing system for the system.

System 10 can include a processing system ("PS") 50. Referring to FIG. 6, PS 50 can include one or more processors 1001, memory 1002, one or more input/output devices 1003, one or more sensors 1004, one or more user interfaces 1005, and one or more actuators 1006.

Processors 1001 can include one or more distinct processors, each having one or more cores. Each of the distinct processors can have the same or different structure. Processors 1001 can include one or more central processing units (CPUs), one or more graphics processing units (GPUs), circuitry (e.g., application specific integrated circuits (ASICs)), digital signal processors (DSPs), and the like. Processors 1001 can be mounted on a common substrate or to different substrates.

Processors 1001 are configured to perform a certain function, method, or operation at least when one of the one or more of the distinct processors is capable of executing code, stored on memory 1002 embodying the function, method, or operation. Processors 1001 can be configured to perform any and all functions, methods, and operations disclosed herein.

For example, when the present disclosure states that PS 50 performs/can perform task "X", such a statement should be understood to disclose that PS 50 can be configured to perform task "X". Mobile device 100 and PS 50 are configured to perform a function, method, or operation at least when processors 1001 are configured to do the same.

Memory 1002 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 1002 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code saved in memory 1002.

Input-output devices 1003 can include any component for trafficking data such as ports, antennas (i.e., transceivers), printed conductive paths, and the like. Input-output devices 1003 can enable wired communication via USB®, DisplayPort®, HDMI®, Ethernet, and the like. Input-output devices 1003 can enable electronic, optical, magnetic, and holographic, communication with suitable memory 1003. Input-output devices 1003 can enable wireless communication via WiFi®, Bluetooth®, cellular (e.g., LTE®, CDMA®, GSM®, WiMax®, NFC®), GPS, and the like. Input-output devices 1003 can include wired and/or wireless communication pathways.

Sensors 1004 can capture physical measurements of environment and report the same to processors 1001. Examples of sensors 1004 include pressure sensors, temperature sensors, and flow rate sensors, which can be disposed at any (e.g., every) point in the cooling circuit diagrams. User interface 1005 can include display 120 (e.g., LED touchscreens (e.g., OLED touchscreens), physical buttons, speakers, microphones, keyboards, and the like. Actuators 1006 can enable processors 1001 to control mechanical forces. For example, actuators can be electronically controllable motors disposed in pumps, valves, and compressors. Every valve, pump, and compressor discussed herein can be independently controllable by PS 50 based on pressure and/or temperature measurements.

PS 50 can be distributed. For example, some elements of PS 50 can be disposed inside an aircraft body while other elements of PS 50 can be disposed in system 10. PS 50 can have a modular design where certain features have a plurality of the aspects shown in FIG. 6. For example, I/O modules can include volatile memory and one or more processors.

I claim:

1. A system comprising:
   a gas turbine comprising a compressor coupled to a turbine through a shaft;
   an electric machine configured to convert rotational energy supplied by the gas turbine into electric energy;
   intermediate circuitry comprising a converter, the intermediate circuitry configured to receive electric energy supplied by the electric machine; and
   a processing system comprising one or more processors configured to:
      control the gas turbine to maintain a first global state of a first global condition;
      automatically iterate an operating condition of the system through a plurality of operating states while maintaining the first global state of the first global condition;
      determine an efficiency of the system at each of the plurality of the operating states; and
      for each of the plurality of operating states: select a future operating state of the system based on the determined efficiency of the current operating state
   wherein the first global condition comprises at least one of a thrust provided by the gas turbine, a velocity of a vehicle to which the gas turbine is attached, a propulsive power provided by the gas turbine, a fuel power of the gas turbine, or an efficiency of the gas turbine, and
   wherein the operating condition is at least one of: a switching frequency, a switching pulse time, and an output voltage of the converter.

2. The system of claim 1, wherein the one or more processors are configured to determine the efficiency of the system by capturing a temperature increase of each of a plurality of working fluids.

3. The system of claim 2, wherein the one or more processors are configured to determine the efficiency of the system by capturing a flow rate of each of the plurality of working fluids.

4. The system of claim 3, wherein the one or more processors are configured to determine the efficiency of the system by capturing a rate of temperature change for each of a plurality of solid components in the system.

5. The system of claim 1, wherein the one or more processors are configured to map the efficiency of the system at one of the plurality of operating states against a measured ambient condition.

6. The system of claim 5, wherein the one or more processors are configured to, before automatically iterating the operating condition of the system through the plurality of operating states, select an initial operating condition based on the map.

7. The system of claim 1, wherein the one or more processors are configured to determine the efficiency of the system by determining a fuel power based on a flow rate of fuel to the gas turbine.

8. The system of claim 1, wherein the one or more processors are configured to automatically iterate the operating condition of the system through the plurality of operating states while maintaining the first global state of the first global condition by at least automatically iterating a component operating condition of a selected component of the system through a plurality of component operating states while maintaining the first global state of the first global condition.

9. The system of claim 1, wherein, to automatically iterate the operating condition, the processing system is configured to:
   increase, during a first time interval, a level of the operating condition of the system above an initial level of the operating condition; and
   decrease, during a second time interval that is different than the first time interval, the level of the operating condition of the system below the initial level of the operating condition.

10. In a system comprising a gas turbine comprising a compressor coupled to a turbine through a shaft, a method comprising:
   controlling, by one or more processors of a processing unit, the gas turbine to maintain a first global state of a first global condition;
   automatically iterating an operating condition of the system through a plurality of operating states while maintaining the first global state of the first global condition;
   determining an efficiency of the system at each of the plurality of the operating states; and
   for each of the plurality of operating states:
   selecting a future operating state of the system based on the efficiency of the current operating state determined during the determining,
   wherein the system comprises an electric machine configured to convert rotational energy supplied by the gas turbine into electric energy,
   wherein the system comprises intermediate circuitry comprising a converter, the intermediate circuitry configured to receive electric energy supplied by the electric machine, wherein the first global condition comprises at least one of a thrust provided by the gas turbine, a velocity of a vehicle to which the gas turbine is attached, a propulsive power provided by the gas turbine, a fuel power of the gas turbine, or an efficiency of the gas turbine, and wherein the operating condition is at least one of:
a switching frequency, a switching pulse time, and an output voltage of the converter.

11. The method of claim 10 comprising mapping the efficiency of the system at one of the plurality of operating states against a measured ambient condition.

12. The method of claim 11 comprising before automatically iterating the operating condition of the system through the plurality of operating states, selecting an initial operating condition based on the mapping.

13. The method of claim 10 comprising performing a repair on the gas turbine based on one efficiency determined during the determining.

* * * * *